UNITED STATES PATENT OFFICE.

CARL LORTZING, OF CHARKOW, RUSSIA.

ART OF MAKING ARTIFICIAL ASPHALTUM FROM THE RESIDUE OF TANNERIES.

SPECIFICATION forming part of Letters Patent No. 303,301, dated August 12, 1884.

Application filed March 13, 1884. (No specimens.)

*To all whom it may concern:*

Be it known that I, CARL LORTZING, of Charkow, in Russia, have invented Improvements in the Art of Making Artificial Asphaltum from the Residue of Tanneries, of which the following is a full and clear specification.

The object of the invention is to produce an artificial asphaltum by treatment of the residue or waste waters of tanneries, wool-washeries, fulling-mills, albumen-factories, and similar industries.

The invention consists in first collecting the precipitated residuum of such waste waters in then drying and powdering the said residuum, in then mixing it with powdered limestone, and in finally subjecting the said mixture to heat. The waste waters are deprived of their impurities, dregs, and other admixed bodies, which contain more or less bitumen, by any suitable means which are well known. Per example: These waters may be collected in tanks or reservoirs, in which the above-mentioned impurities are allowed to settle down, when the purified fluid is decanted and the precipitated residue is collected; or the waste waters are strained or filtered through sieves, straw, gravel, or separated from the impurities by other devices answering the purposes, according to circumstances, and when a sufficient quantity of the residue has accumulated it is collected. The residue obtained in these or other ways is cautiously dried at a low temperature, so as not to destroy the bitumen, and then pulverized and mixed with powdered limestone in different proportions, according to the quality of the bitumen and to the purposes for which this mixture (artificial asphaltum) is intended to be used.

The powdered and heated artificial asphaltum can, like the natural asphaltum, be used for pavement purposes of streets or roads in the common manner by stamping down a layer of it (eventually mixed with sand or gravel) by heated rollers or rammers; or it can be used as the fundamental material for producing asphaltic mastic. For this purpose the powdered artificial asphaltum is brought between heated rollers or treated in any other suitable and heated kneading-machine or pug-mill until it assumes a tough, doughy condition, adding meanwhile as much powdered limestone or other filling substances as deemed proper. The product, formed into blocks and cooled down, possesses all the qualities and the appearance of the asphaltic mastic heretofore known and used and made by means of the natural asphaltum.

The artificial asphaltum can further be used as the fundamental material of asphaltic cement, goudron, and all other compositions which are made by means of the natural asphaltum.

I claim—

The art of making artificial asphaltum from the waste waters of tanneries and the like, which art consists in first collecting the precipitated residuum of said waters, in then drying and powdering such residuum, and in then mixing it with powdered limestone, and in finally subjecting said mixture to heat and pressure, substantially as described.

This specification signed by me this 7th day of February, 1884.

CARL LORTZING.

Witnesses:
CARL T. BURKHARDT,
ULR. R. MAERZ.